United States Patent
LaFond et al.

(10) Patent No.: US 7,469,588 B2
(45) Date of Patent: Dec. 30, 2008

(54) MEMS VERTICAL COMB DRIVE WITH IMPROVED VIBRATION PERFORMANCE

(75) Inventors: Peter H. LaFond, Redmond, WA (US); Lianzhong Yu, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/383,685

(22) Filed: May 16, 2006

(65) Prior Publication Data

US 2007/0266787 A1 Nov. 22, 2007

(51) Int. Cl.
*G01P 15/125* (2006.01)
(52) U.S. Cl. ............................ 73/514.32; 73/514.38
(58) Field of Classification Search ............. 73/514.32, 73/514.36, 514.38, 514.29, 514.16, 514.01, 73/504.12, 504.14
See application file for complete search history.

(56) References Cited

U.S. PATENT DOCUMENTS

| | | | |
|---|---|---|---|
| 5,969,848 A | 10/1999 | Lee et al. | |
| 6,000,280 A | 12/1999 | Miller et al. | |
| 6,277,666 B1 | 8/2001 | Hays et al. | |
| 6,582,985 B2 | 6/2003 | Cabuz et al. | |
| 6,612,029 B2 | 9/2003 | Behin et al. | |
| 6,679,995 B1* | 1/2004 | Banjac et al. | 216/2 |
| 6,705,116 B2 | 3/2004 | Matsuo et al. | |
| 6,744,173 B2 | 6/2004 | Behin et al. | |
| 7,258,010 B2* | 8/2007 | Horning et al. | 73/514.32 |
| 7,270,003 B2* | 9/2007 | Sassolini et al. | 73/514.32 |
| 2002/0005976 A1 | 1/2002 | Behin et al. | |

FOREIGN PATENT DOCUMENTS

| | | |
|---|---|---|
| EP | 1624584 A | 2/2006 |
| JP | 8166405 A | 6/1996 |

OTHER PUBLICATIONS

W. Tang, et al.; Electrostatic comb drive levitation and control method; IEEE; vol. 1, No. 4, pp. 170-178, Dec. 1992.
E. Carlen, et al.; High-aspect ratio vertical comb-drive actuator with small self-aligned finger gaps; IEEE; vol. 14, No. 5, pp. 1144-1155, Oct. 2005.

(Continued)

*Primary Examiner*—Helen C. Kwok

(57) ABSTRACT

A Micro-Electro-Mechanical System closed-loop (MEMS) inertial device having a vertical comb drive that exhibits improved performance under vibration. The device includes one or more stator tines extending from a housing into a cavity formed by the housing. One or more rotor tines extend from a proof mass located in the cavity. The proof mass is joined to the housing by flexures which allow movement in the vertical direction. The rotor tines have a first length value in the direction of movement and the stator tines have a second length value in the direction of movement. The second length value is greater than the first length value. Also, the stator tines include two electrically separated portions. The lesser length of the rotor tines relative to the stator tines causes the attractive force between the rotor tines and either the upper or lower half of the stator tines to be relatively independent of rotor vertical position. This, in turn, produces better accelerometer accuracy in vibration environments.

9 Claims, 14 Drawing Sheets

OTHER PUBLICATIONS

Julius Ming-Lin Tsai, et al.; The BELST ll process for a silicon high-aspect-ratio micromaching vertical comb actuator and its applications; Journal of Micromechanics and Microengineering, IOP Publishing Ltd 2004, pp. 235-241.

Q.X. Zhang, et al.; Fabrication technique for microelectromechanical systems vertical comb-drive actuators on a monolithic silicon substrate; American Vacuum Society 2005, pp. 32-41.

Arjun Selvakumar, et al.; Vertical Comb Array Microactuators; Journal of Microelectromechanical Systems, vol. 12, No. 4, Aug. 2003; IEEE 2003, pp. 440-449.

C. Tsou, et al.; Self-Aligned Vertical Electrostatic Combdrives for Scanning Micromirrors; IEEE 2005, pp. 72-75.

Toshiyuki Tsuchiya, et al.; A Z-Axis Differential Capacitive SOI Accelerometer With Vertical Comb Electrodes; IEEE 2004, pp. 524-527.

* cited by examiner

MEMS VERTICAL COMB DRIVE WITH IMPROVED VIBRATION PERFORMANCE

BACKGROUND OF THE INVENTION

High performance Micro-Electro-Mechanical Systems (MEMS) inertial instruments (accelerometers and gyros) require closed-loop operation. Good performance under vibration requires that the magnitude of the electrostatic feedback force be highly insensitive to the position of the instrument's inertial mass relative to it's null position. Because of their high force dependency on position, the typical electrostatic vertical comb drive as employed in MEMS actuators cannot be applied to precision MEMS inertial instruments.

FIG. 1 illustrates an instrument that performs acceptably under static accelerations. However, if vibration were superimposed on a static acceleration, a large error in the time-average measured acceleration would result. This error is called vibration rectification, whose nature and sources are well known by those in the field. One major source of vibration rectification error in closed-loop instruments is the proof mass positional-dependence of the feedback force. When the rotor and stator teeth are substantially aligned (same height), the electrostatic force between the rotors and the upper or lower half of the stators changes greatly with a small vertical movement of the rotor teeth. As these rotor teeth move up and down with applied external vibration, the time average differential voltage that results is different from the voltage that would occur with only the static acceleration input. This is an accelerometer error. The $2^{nd}$ order portion of the force-position dependency is the main source of the error, but $1^{st}$ and higher than $2^{nd}$ order components can also contribute. The contribution to the error from the various order components depends on the details of the design. Regardless, the need is for a design which significantly reduces this position dependency, especially a $2^{nd}$ order dependency.

Therefore, there exists a need for an electrostatic MEMS drive, which has very low position sensitivity.

SUMMARY

The present invention provides a Micro-Electro-Mechanical System (MEMS) device having a vertical comb drive that exhibits an improved position-independence force by promoting a substantially uniform rate of capacitance change with respect to change in position. The device includes one or more stator tines extending from a housing into a cavity formed by the housing. One or more rotor tines extend from a proof mass located in the cavity. The two groups of tines are interleaved so that each rotor tine fits between two stator tines, and visa-versa. Each rotor tine is positioned at a capacitive distance from two stator tines (except at the end of the line). When an inertial force is experienced, the instrument's proof mass tends to move in a direction approximately orthogonal to a normal vector between the corresponding tines. The rotor tines have a first length value in the direction of movement and the stator tines have a second length value in the direction of movement. The second length value is greater than the first length value. Also, the stator tines include two electrically separated portions.

The electrically separated portions in the rotor tines are separated by an oxide, or other insulating layer, into approximately equal halves.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
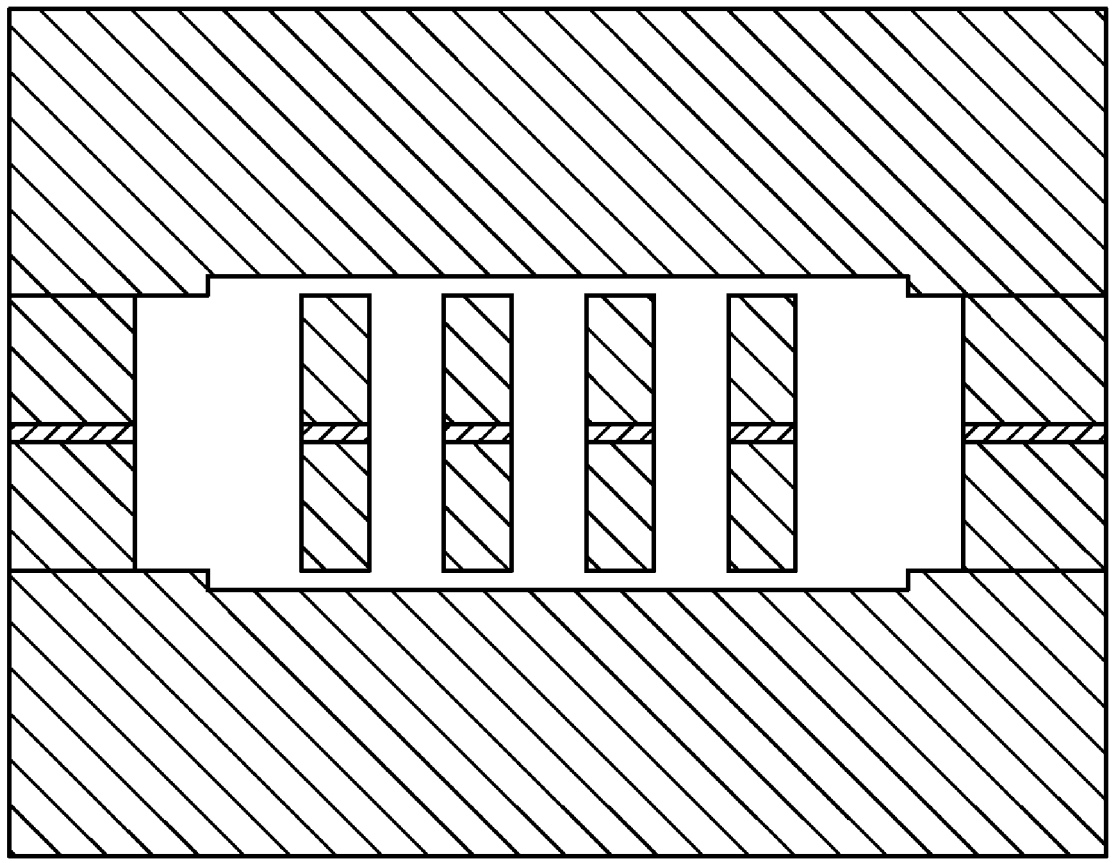
FIG. 1 illustrates a cross-sectional view of slice of a comb structure used in the prior art.
Figure 2:
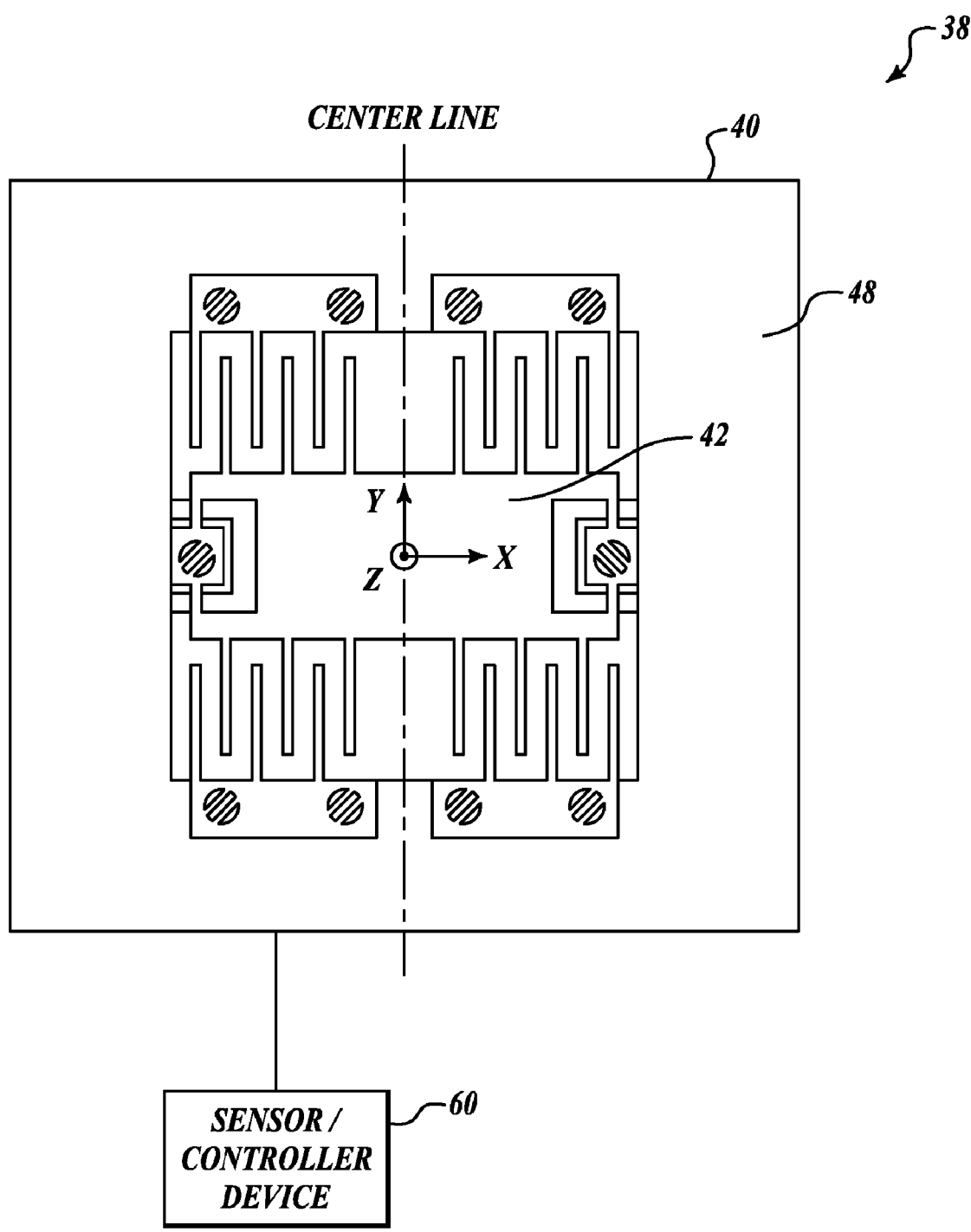
FIG. 2 illustrates a block diagram of a sensor system formed in accordance with an embodiment of the present invention.

FIG. 2 illustrates a sensor system 38 for improved vibration rectification performance. In this example, the system 38 includes a Micro-Electro-Mechanical Systems (MEMS) device 40 that is an accelerometer for sensing forces due to acceleration along the vertical or Z-axis. All figures and description refer to an accelerometer, but this invention also applies to gyros.

The MEMS device 40 includes a proof mass 42 having a plurality of rotor tines 44 (or combed fingers or teeth, all used interchangeably). The proof mass 42 is located within a housing 48 and is joined to this housing by flexures which allow relatively free motion of the proof mass in the vertical direction but are generally stiff in other directions. Extending from sections of the housing 48 and interleaved with the rotor tines 44 are stator tines 46. The stator tines 46 are electrically coupled to a servo/controller device 60. The device 60 senses vertical relative motion between the proof mass and supporting frame by a method and means not discussed here. Typically this sense, or pick-off, would operate capacitively. Once the device 60 senses a proof mass movement, the device 60 sends a signal to the stator tines 46 in order to force the rotor tines 44 back to a null position. The signal (e.g., voltage value) that is sent to the stator tines 46 for forcing the rotor tines 44 back to null position is used to calculate the amount of acceleration that the proof mass 42 is experiencing.

Figure 3:
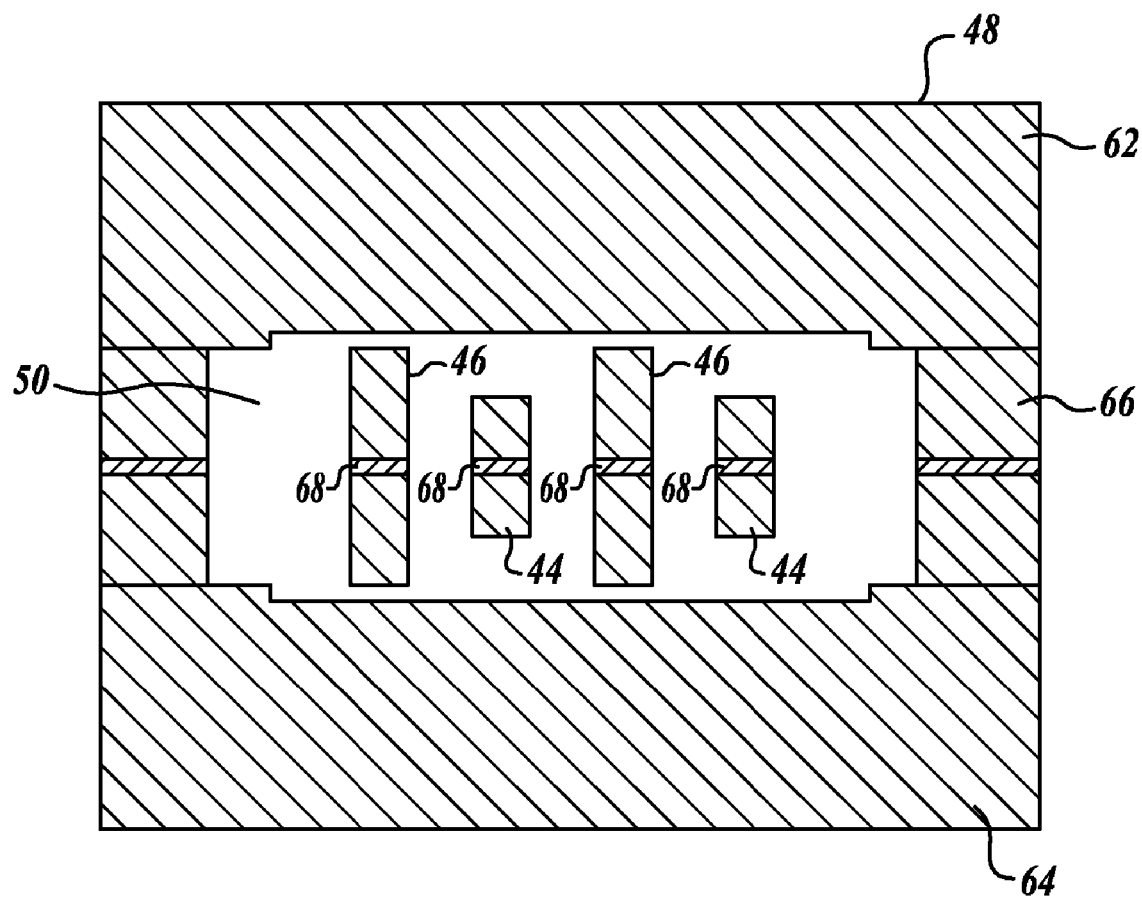
FIG. 3 illustrates a cross-sectional view of slice of a comb structure used in a component of the system shown in FIG. 1.

FIG. 3 illustrates a side view of a slice of the device 40 of FIG. 2. The rotor and stator tines 44 and 46 as well as the remainder of the proof mass (not shown) are located within a cavity 50 formed by the housing 48. The housing 48 includes first and second wafers 62 and 64 and a sidewall structure 66. The rotor tines 44 are shorter in a vertical direction than the stator tines 46. Also, each of the tines 44 and 46 includes an insulating layer 68 that separates the tines 44 and 46 into two electrically separate halves. The insulating layer 68 acts as an electrical insulator between the silicon (Si) halves. In one embodiment, each of the halves of the stator tines 46 are electrically coupled to the servo/controller device 60. Although the oxide layers 68 separates the halves of the rotor tines 44, a device is applied to the rotor tines 44 in order to electrically couple both of the halves. This electrically coupling device is located internal to the tines 44 or external to the tines 44.

If a sudden steady-state upwards acceleration is applied to the frame and stator tines 46, the proof mass, with rotor tines 44, will initially lag behind. This positional lag is sensed by elements of the device not discussed here, and the action of the device 60 causes the appropriate differential voltage to be applied between the upper half of the stator tine 46 and the rotor tine 44, returning the proof mass to its null position (assuming the controller device 60 has an integrator function).

From elementary electrostatics theory, it is know that the magnitude of the attractive force experienced by the rotor tines 44 of the proof mass 42 is proportional to a rate of change of capacitance experienced between the rotor and stator tines 44 and 46 with vertical motion, and to the square of the differential voltage. The action of the controller device 60 is to determine the voltage required to exactly counter-balance the inertial force applied to the proof mass. The differential voltage required is approximately proportional to the square-root of the applied acceleration, and thus can be used to determine the acceleration. With downwards acceleration, the differential voltage is applied between the rotors tines 44 and the lower half of the stators tines 46.

The problem discussed above is overcome by arranging for the rotor tines 44 to be vertically offset from the stator tines 46 at both their tops and bottoms, as shown in FIG. 3. Analytically, the force-position relation for any given tine geometry can be determined by performing a series of capacitance calculations (via a finite element method) as the rotor tines 44 are moved vertically about their null position. The force at any position is proportional to the first derivative of the capacitance at that position. The rectification error that results from a force that varies with position depends on many details of the device, as well as the input acceleration, and can be analytically calculated using system simulation software (Simulink, for example).

Figure 4:
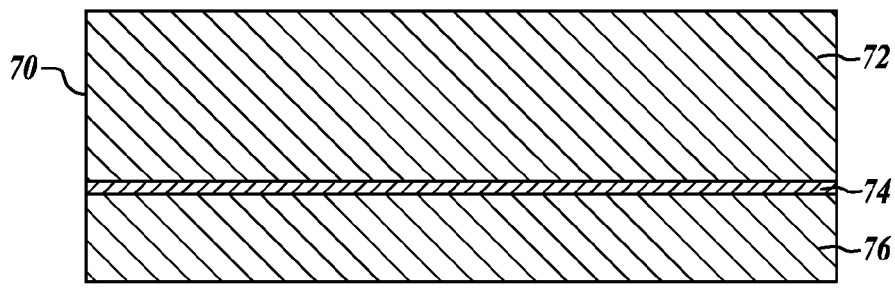
FIGS. 4-18 illustrate cross-sectional slice views of steps in a fabrication process for creating a vertical comb structure in accordance with an embodiment of the present invention.
Figure 5:
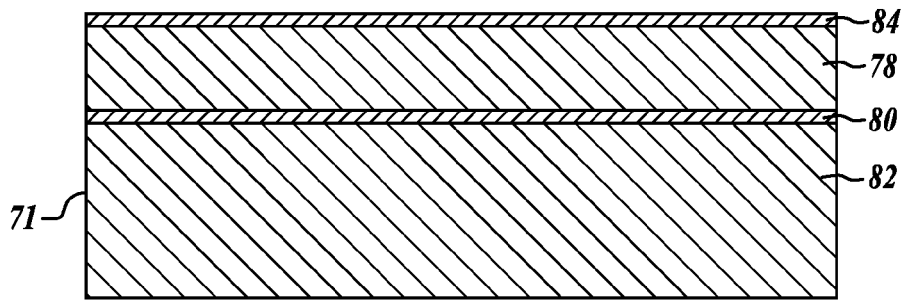

FIGS. 4-18 illustrate side cut-away views of an example fabrication of the device 40 shown in FIGS. 2 and 3. As shown in FIGS. 4 and 5, the fabrication process begins by using two silicon-on-insulator (SOI) wafers 70 and 71. Each of the wafers 70, 71 include a handle layer (silicon-Si) 72 and 82, an oxide layer 74 and 80, and a device layer 76 and 78 that separates the oxide layer 74 and 80 from the handle layer 72 and 82 from the device layers 76 and 56. In this first step, an oxide layer 84 is grown or deposited on the device layer 78.

Figure 6:
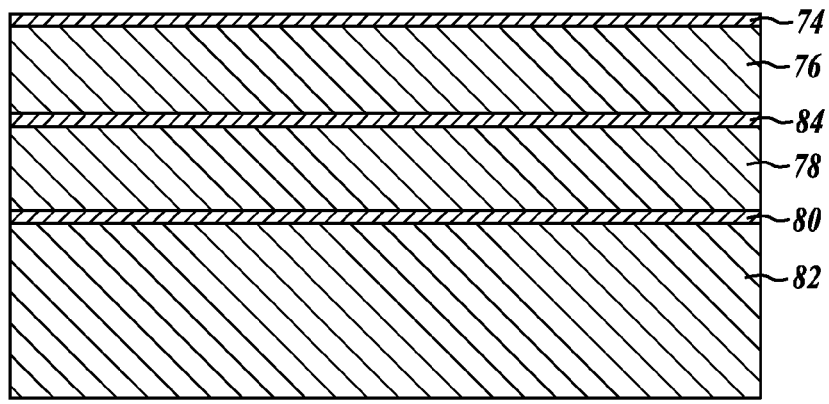

As shown in FIG. 6, the exposed surface of the device layer 76 of the first SOI wafer 70 is bonded to the oxide layer 84 of the second SOI wafer 71 preferably using a fusion bonding technique. The handle layer 72 is then removed, thus producing a double SOI wafer.

Figure 7:
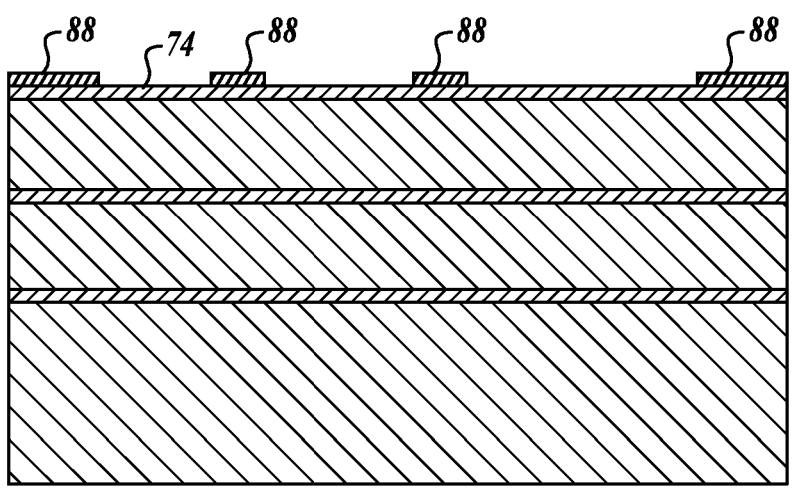
Figure 8:
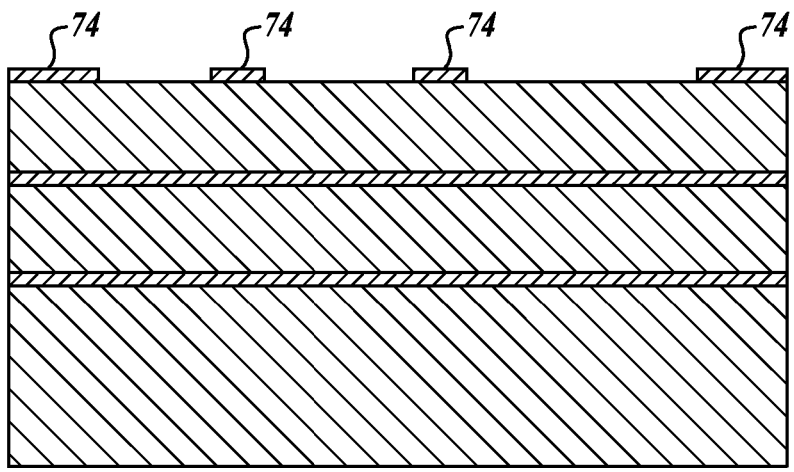

As shown in FIG. 7, a photoresist mask pattern 88 is applied over the oxide layer 74. Then, as shown in FIG. 8, the unprotected oxide of the oxide layer 74 is etched and then the photoresist pattern 88 is removed.

Figure 9:
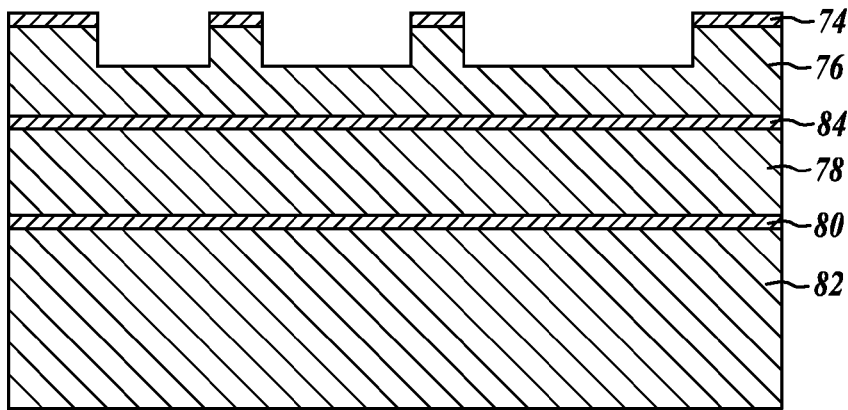
Figure 10:
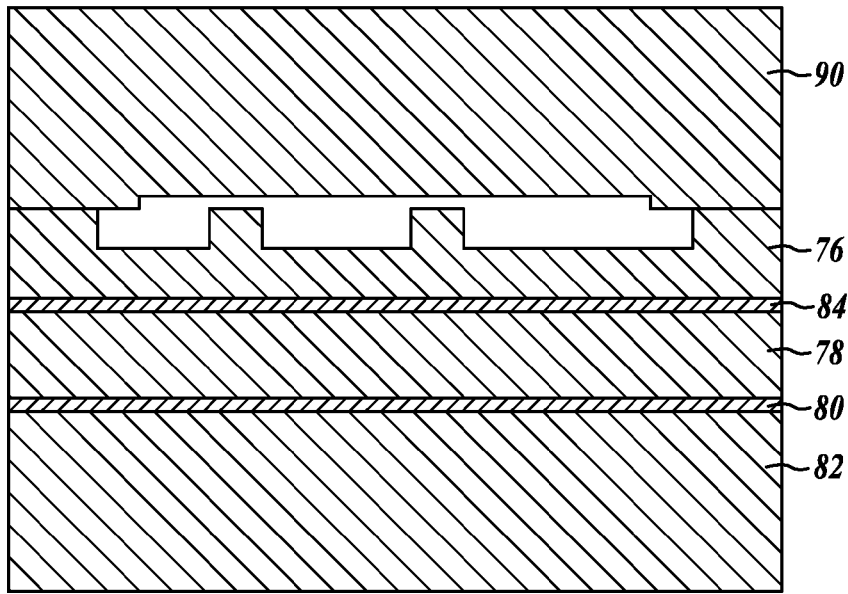

As shown in FIG. 9, a Si deep reactive ion etch (DRIE) is performed on the device layer 76 to a pre-defined depth. As shown in FIG. 10, the remaining oxide in the oxide layer 74 is removed and a first cap wafer 90 is bonded to the device layer 76. This bonding is a Si—Si bond using a fusion bond process or can be performed using a eutetic bond. The cap wafer 90 has been previously etched in order that posts created in the DRIE process shown in FIG. 9 do not come in contact with the surface of the cap wafer 90.

Figure 11:
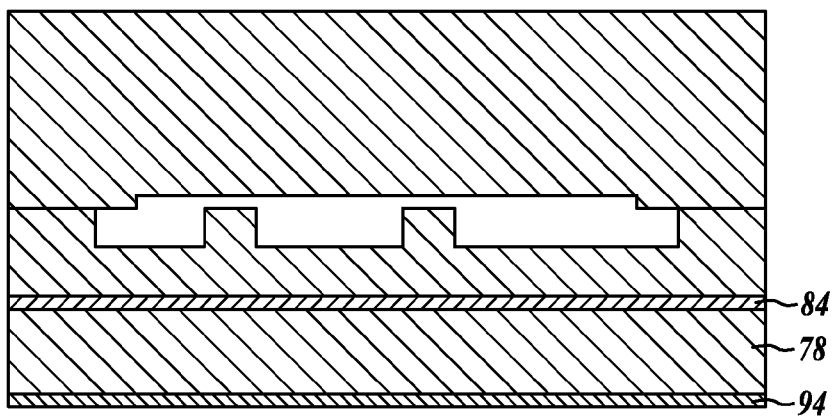
Figure 12:
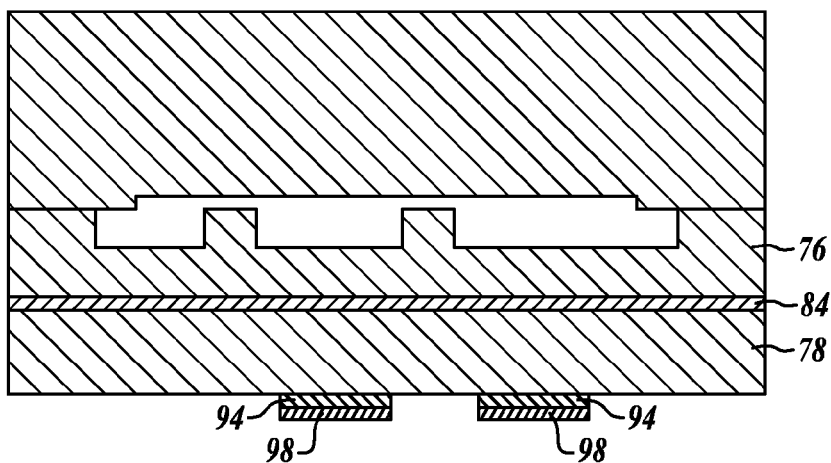
Figure 13:
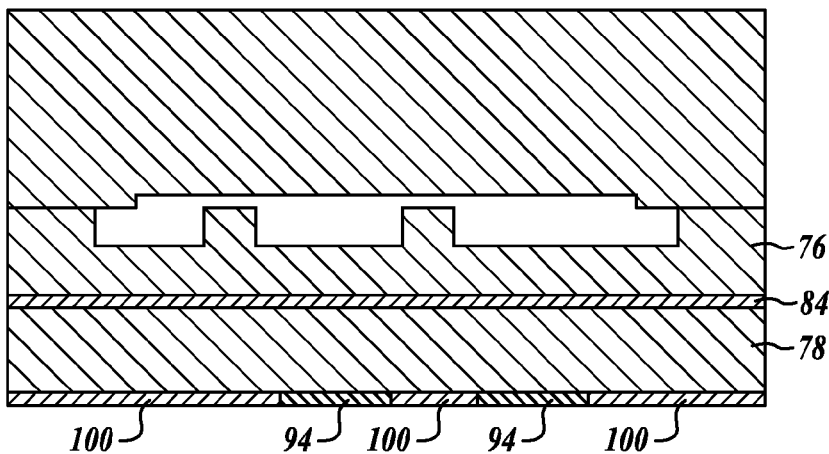

As shown in FIG. 11, the handle layer 82 of the second SOI wafer 71 is removed by a wet chemical etch (KOH, TMAH and EDP) or a DRIE, or mechanical grinding followed by a wet or dry etch. The oxide layer 80 is removed and a nitride ($Si_3N_4$) layer 94 is deposited on the surface of the device layer 78. Next, as shown in FIG. 12, the nitride layer 94 is etched according to an applied pattern of photoresist 98. As shown in FIG. 13, the photoresist 98 is removed and an oxide layer 100 is grown on the surface of the device layer 78 in the locations where the nitride no longer exists.

Figure 14:
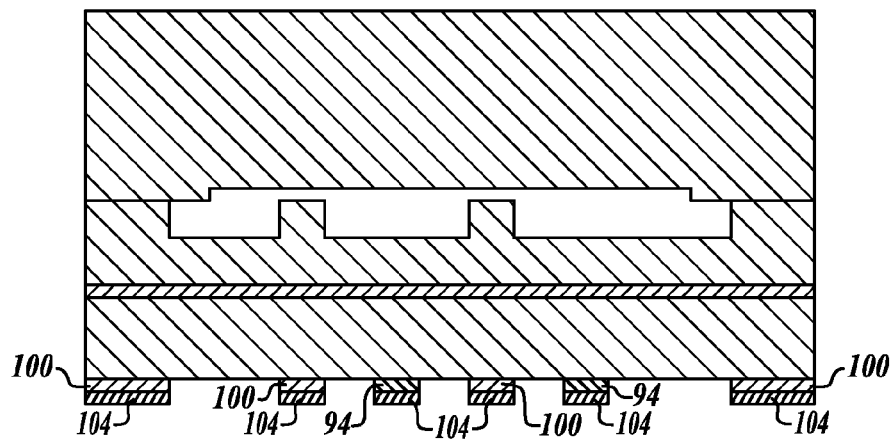
Figure 15:
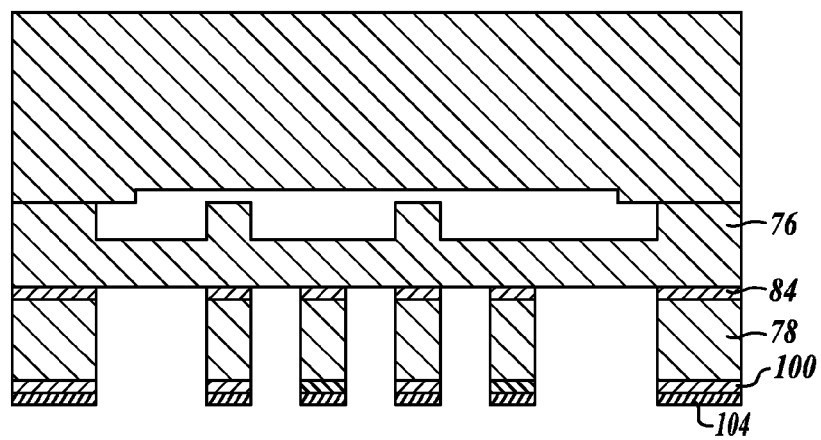

As shown in FIG. 14, a photoresist pattern 104 is applied and then exposed portions of the oxide layer 100 and the nitride layer 94 are etched. The oxide layer 100 and the nitride layer 94 can be etched simultaneously suing a plasma etch. As shown in FIG. 15, the unprotected portion of the device layer 78 is then etched using a DRIE all the way to the oxide layer 84. Then, the exposed oxide layer 84 is etched to the surface of the device layer 76.

Figure 16:
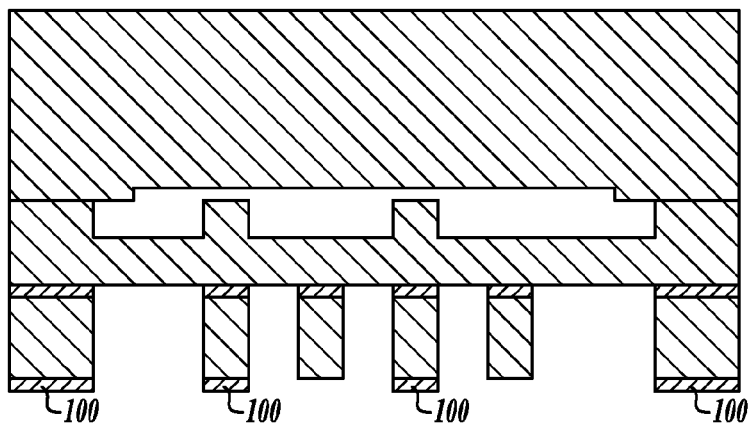
Figure 17:
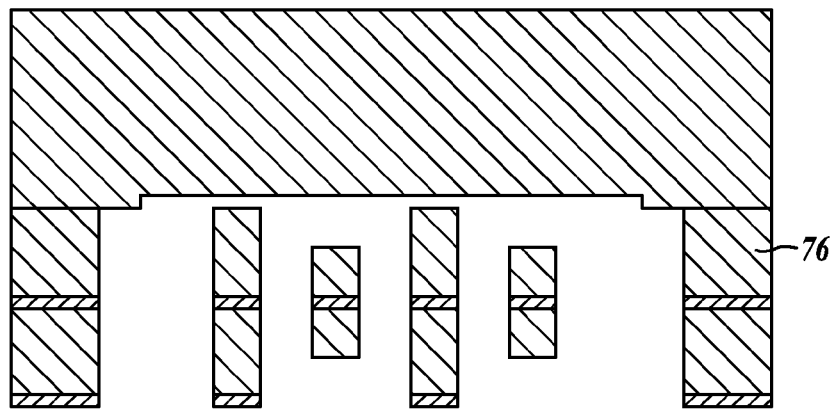
Figure 18:
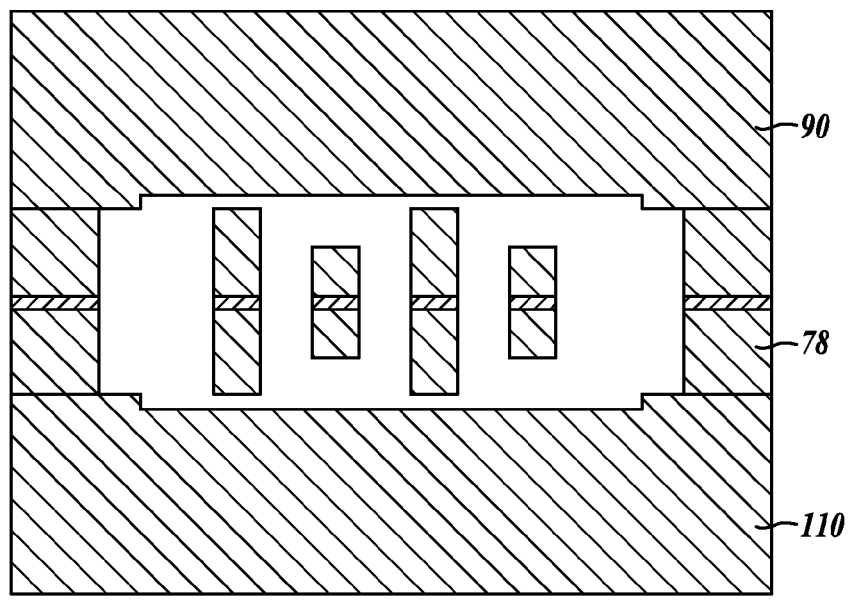

As shown in FIG. 16, the photoresist 104 is removed and then the remaining nitride 94 is removed by hot phosphoric acid. Next, as shown in FIG. 17, a DRIE etch is performed in order to remove a portion of the device layer 78 previously covered by the nitride 94 and the remaining exposed portion of the device layer 76. As shown in FIG. 18, the oxide layer 100 is etched and a second cap wafer 110 that is similar to the first cap wafer 90 is fusion bonded to the exposed surface of the device layer 78, thereby producing rotor tines that are smaller than stator tines in a combed drive structure.

Figure 19:
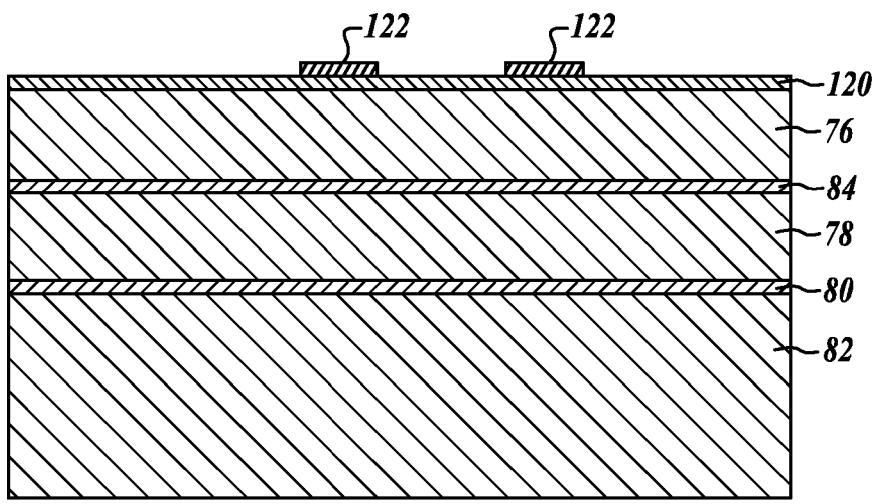
FIGS. 19-29 illustrate cross-sectional slice views of steps in an alternate fabrication process for creating a vertical comb structure in accordance with an alternate embodiment of the present invention.
Figure 20:
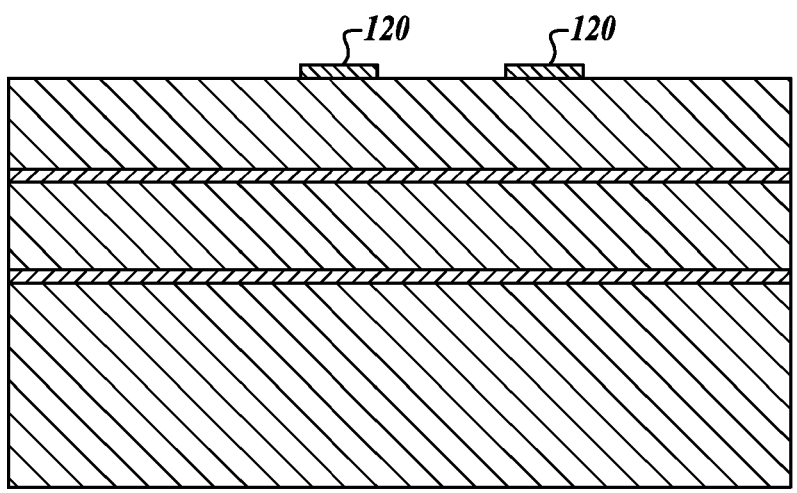

FIGS. 19-29 illustrate side cross-sectional slice views of an alternate fabrication process that begins after the step shown in FIG. 5, except that a layer of nitride 120 is deposited on the surface of the device layer 76 instead of an oxide layer. A photoresist mask 122 is then applied over the nitride layer 120. Next, as shown in FIG. 19, a nitride etch is performed and the photoresist mask 122 is removed.

Figure 21:
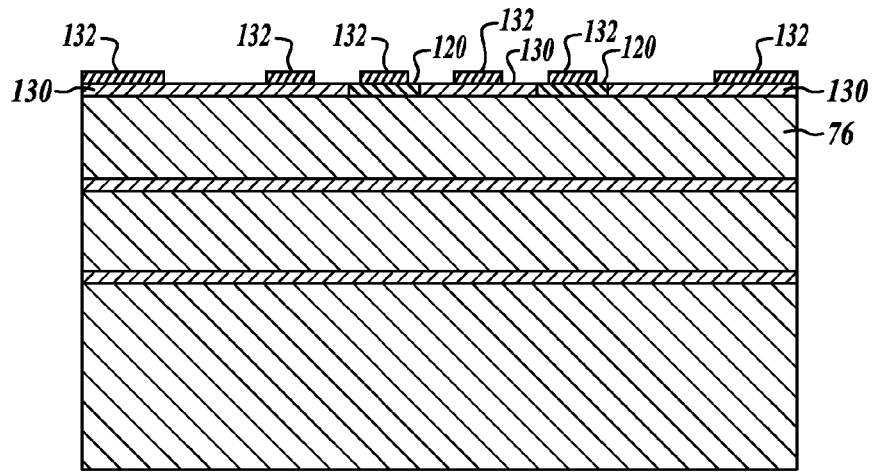

As shown in FIG. 21, an oxide layer 130 is applied to the exposed surface of the device layer 76 and then a photoresist pattern 132 is applied over portions of the oxide layer 130 and nitride layer 120.

Figure 22:
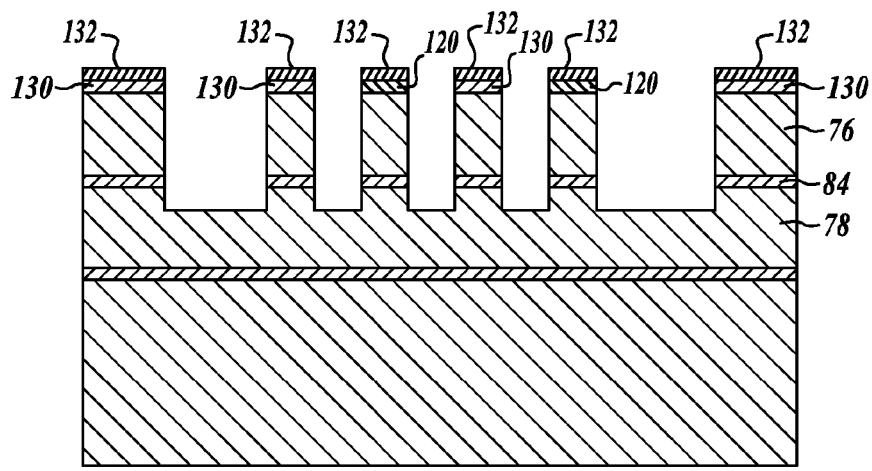

Next, as shown in FIG. 22, an oxide and nitride etch are performed down to the surface of the device layer 76, then a DRIE of the exposed device layer 76 is performed down to the oxide layer 84, another oxide etch is performed to remove the oxide layer 84, and finally, a second DRIE is performed to etch a portion of the device layer 78.

Figure 23:
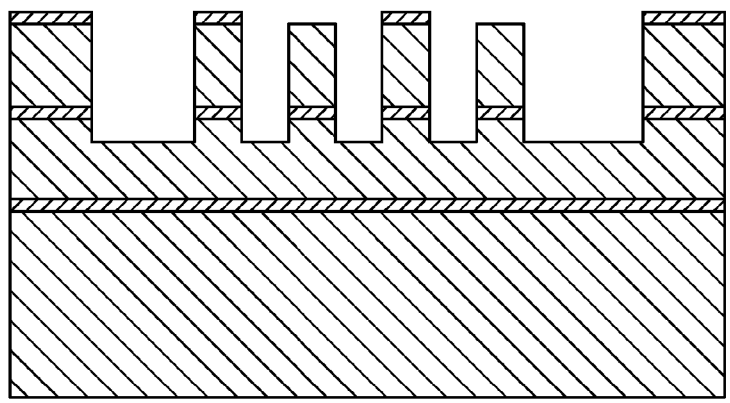

As shown in FIG. 23, the photoresist pattern 132 is removed. Then, the remaining nitride layer 120 is etched (for example, using hot phosphoric acid which only removes nitride).

Figure 24:
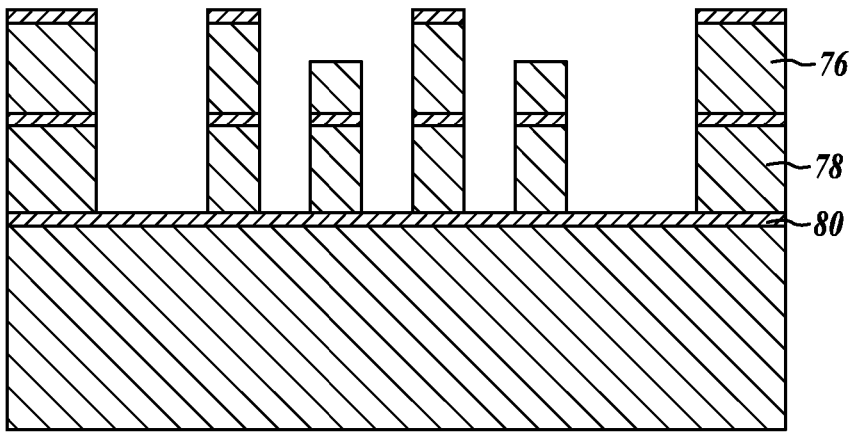
Figure 25:
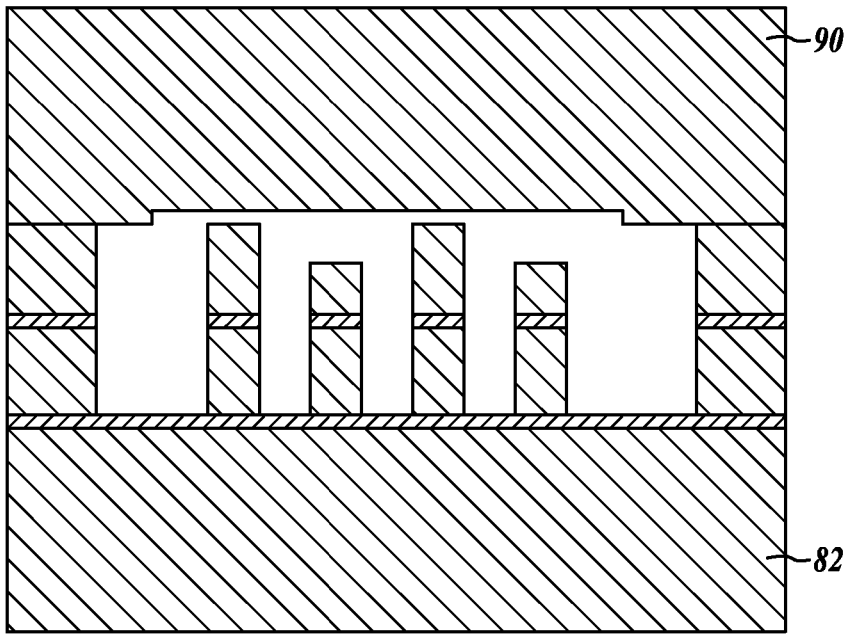

Next, as shown in FIG. 24, another DRIE is performed thus etching the remaining exposed portion of the device layer 78 down to the surface of the oxide layer 80 and a portion of the device layer 76 that was previously protected by the just removed nitride layer 120. As shown in FIG. 25, the cap wafer 90 is bonded to the device layer 76 after removal of the oxide layer 120.

Figure 26:
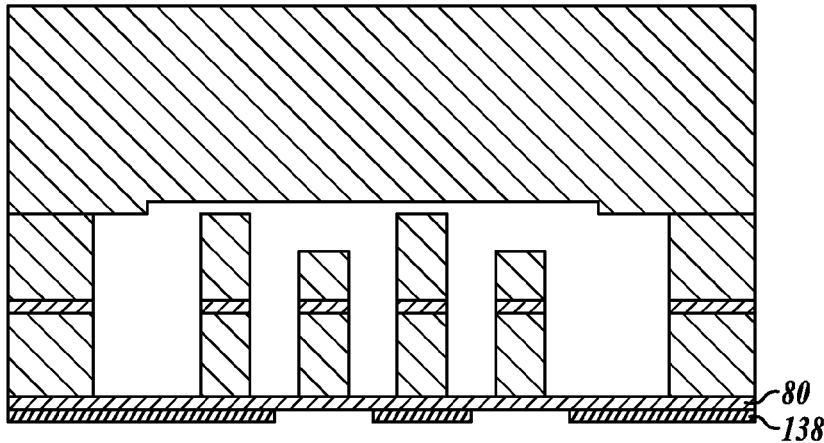
Figure 27:
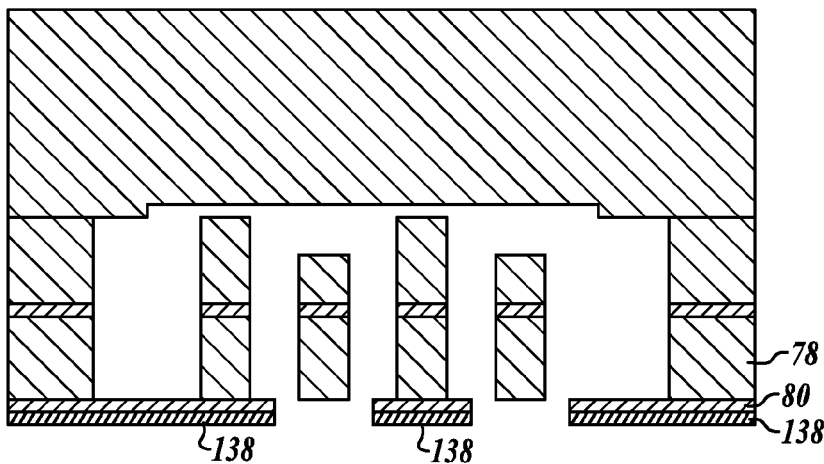
Figure 28:
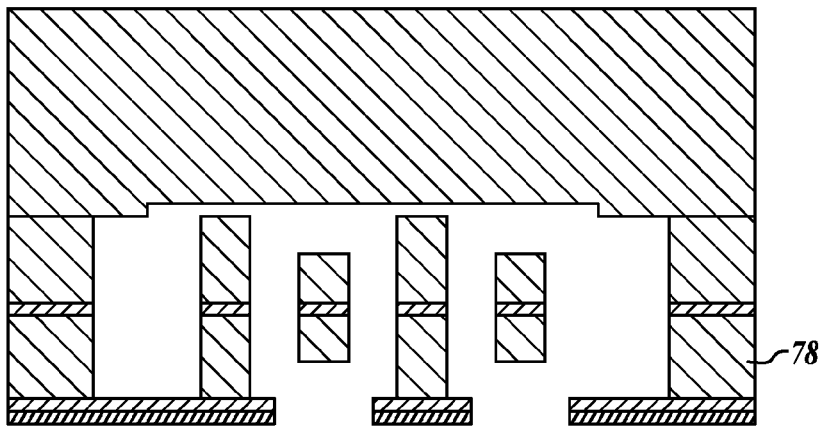
Figure 29:
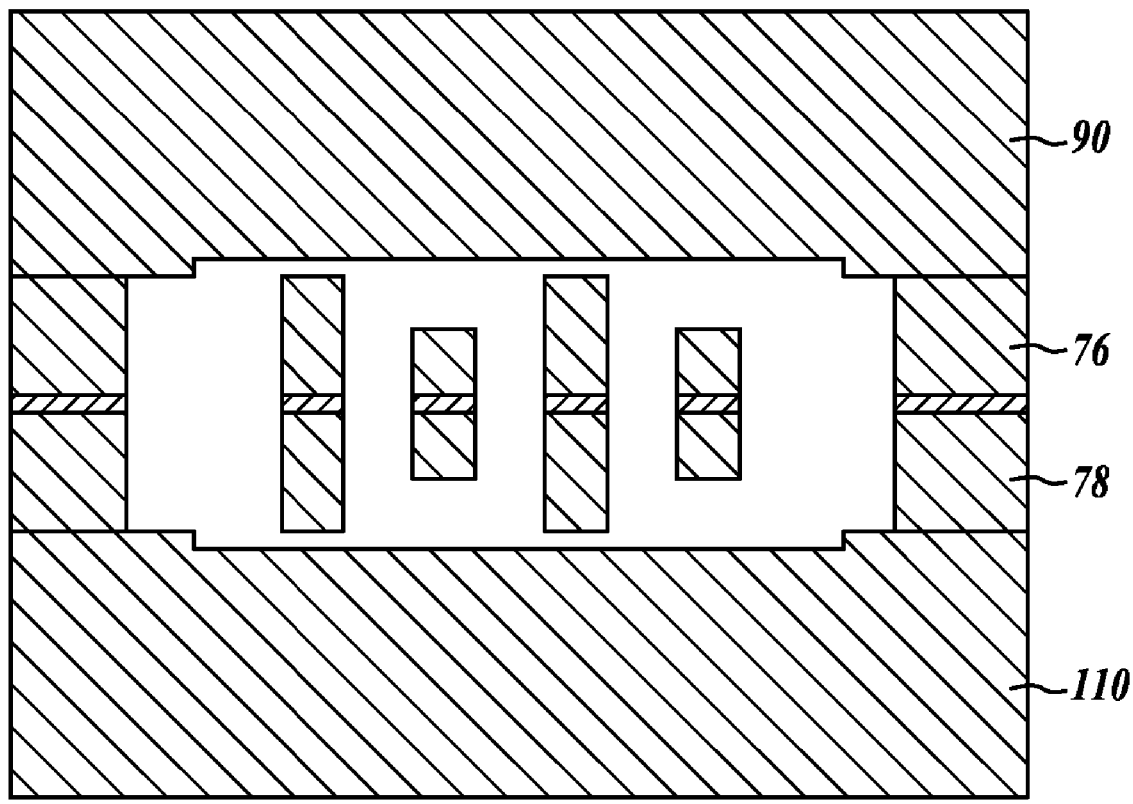

As shown in FIG. 26, the handle layer 82 is removed, thereby exposing the oxide layer 80. A photoresist pattern 138 is applied over portions of the oxide layer 80. Next, as shown in FIG. 27, the portion of the oxide layer 80 that is exposed is etched. As shown in FIG. 28, a DRIE is performed on the exposed area of device layer 78. Finally, as shown in FIG. 29, the photoresist pattern 138 is removed as well as the oxide layer 80. Then, the cap wafer 110 is bonded to the device layer 78.

During fabrication electrical leads are attached to the portions of the stators and any other components of the system.

While the preferred embodiment of the invention has been illustrated and as noted above, many changes can be made without departing from the spirit of the invention. Accordingly, the scope of the invention is not limited by the of the preferred embodiment. Instead, the invention should be determined reference to the claims that follow.

The invention claimed is:

1. A Micro-Electro-Mechanical System (MEMS) comprising:
   a housing defining an enclosed cavity;
   one or more stator tines extending from the housing into the cavity; and
   a MEMS device located in the cavity, the MEMS device comprising:
      a proof mass coupled to the housing; and
      one or more rotor tines extending from the proof mass, each rotor tine being positioned at a capacitive distance from a corresponding stator tine,
      wherein the proof mass is configured to deflect in a direction approximately orthogonal to a vector normal between the corresponding tines,
      wherein the rotor tines have a first height value in the direction of deflection and the stator tines having a second height value in the direction of deflection, the second height value being greater than the first height value;
   wherein the stator tines include at least one tine with two electrically separated portions,
   wherein the rotor tines include at least one tine having first and second portions physically separated by a third portion, thereby forming a MEMS sensor having reduced vibration rectification error due to force applied between the rotor tines and the stator tines being less dependent upon position of the rotor tines relative to the stator tines,
   wherein the electrically separated portions are separated by an oxide layer,
   wherein when the proof mass is at rest the third portion is level with the oxide layer.

2. The system of claim 1, wherein the electrically separated portions are approximately equal in length.

3. The system of claim 1, further comprising:
   a controller in electrical communication with at least one of the two electrically separated portions of at least one stator tine.

4. The system of claim 3, wherein the controller includes a drive signal generator for sending a drive signal to one of the electrically separated portions based on a previously determined deflection force experienced by the proof mass.

5. The system of claim 1, wherein the MEMS sensor is a vertical comb drive accelerometer.

6. The system of claim 1, wherein the third portion includes an oxide layer.

7. The system of claim 6, wherein the rotor tines includes a device for electrically connecting the first and second portions.

8. The system of claim 1, wherein the MEMS sensor is a closed-loop sensor.

9. The system of claim 8, wherein the closed-loop sensor is an accelerometer.

* * * * *